United States Patent [19]

Yoshida et al.

[11] Patent Number: 4,518,702
[45] Date of Patent: May 21, 1985

[54] SILICON CARBIDE-BORON CARBIDE CARBONACEOUS BODY

[75] Inventors: Hisayoshi Yoshida, Ogoori; Ichitaro Ogawa; Tsuyoshi Hagio, both of Tosu; Kazuo Kobayashi, Kurume; Takayoshi Yamamoto, Iizuka, all of Japan

[73] Assignee: Director-General of the Agency of Industrial Science and Technology, Tokyo, Japan

[21] Appl. No.: 571,188

[22] Filed: Jan. 16, 1984

[30] Foreign Application Priority Data

Jan. 19, 1983 [JP] Japan .................................. 58-6863
May 13, 1983 [JP] Japan ................................ 58-83817

[51] Int. Cl.³ ............................................. C04B 35/56
[52] U.S. Cl. ...................................... 501/90; 501/91; 264/65
[58] Field of Search ....................... 264/65; 501/90, 91

[56] References Cited

U.S. PATENT DOCUMENTS

| 4,067,743 | 1/1978 | Arabei et al. | 501/91 |
| 4,081,284 | 3/1978 | Prochazka et al. | 501/91 |
| 4,179,299 | 12/1979 | Coppola et al. | 501/90 |
| 4,312,954 | 1/1982 | Coppola et al. | 501/90 |
| 4,336,216 | 6/1982 | Watanabe et al. | 264/65 |

FOREIGN PATENT DOCUMENTS

| 44090 | 11/1974 | Japan | 501/90 |
| 71103 | 6/1979 | Japan | 501/90 |
| 56-140075 | 2/1981 | Japan | |
| 0975686 | 11/1982 | U.S.S.R. | 501/90 |

Primary Examiner—Howard S. Williams
Assistant Examiner—Terryence Chapman
Attorney, Agent, or Firm—Brisebois & Kruger

[57] ABSTRACT

The carbonaceous body of the invention is prepared by shaping and sintering a uniform powdery mixture composed of a powder of a low-temperature coke, a powder of boron carbide and a powder of silicon carbide in such a proportion that the weight proportion of the boron carbide and the silicon carbide is in the range from 2:98 to 80:20 and the volume proportion of the coke powder and the combination of the boron carbide and silicon carbide is in the range from 50:50 to 95:5. The carbonaceous body thus obtained is highly resistant against air oxidation even at a temperature of 1400° C. in addition to the outstandingly high mechanical strengths in comparison with conventional carbonaceous shaped materials such as artificial graphite.

6 Claims, 2 Drawing Figures

SILICON CARBIDE-BORON CARBIDE CARBONACEOUS BODY

BACKGROUND OF THE INVENTION

The present invention relates to a highly oxidation-resistant, mechanically high-strength carbonaceous material or, more particularly, to a carbonaceous sintered body mainly composed of a coke powder and having a greatly improved oxidation resistance and high mechanical strengths in comparison with conventional carbonaceous materials.

As is well known, carbonaceous materials are imparted with various excellent properties such as high mechanical strengths at high temperatures, resistance against heat shock, high thermal conductivity, good electric conductivity, low thermal expansion, outstanding chemical stability and others. Carbonaceous materials, however, are not free from a very serious disadvantage that they are highly susceptible to oxidation when heated at a high temperature in an oxidizing atmosphere. For example, oxidation of a carbonaceous body heated in air at a gradually increasing temperature begins at about 300° C. and rapidly proceeds when the temperature exceeds 600° C. Therefore, carbonaceous materials can be used at high temperatures only in a non-oxidizing atmosphere and cannot be used in the atmospheric air despite their excellent high temperature performance in general greatly limiting the fields of their industrial applications.

Of course, there have been many attempts to improve the oxidation resistance of carbonaceous materials including a method in which a carbonaceous material is impregnated with a phosphate compound, a method in which a carbonaceous material is impregnated or coated with a specific component capable of forming a vitreous surface film and a method in which a carbonaceous material or graphite before shaping is admixed with silicon carbide and a ferrosilicon or a combination of silicon carbide and a siliceous binder mainly composed of silicic acid. None of these prior art methods is, however, quite satisfactory. For example, the method of impregnation with a phosphate compound is no more than a means to increase the beginning temperature of the oxidation of carbonaceous materials only by 100° to 200° C. and no good solution of the problem is provided thereby. The second method of impregnation or coating with a vitreous film-forming component is, although effective to some extent, not able to give a stable effect of increasing the oxidation resistance of a carbonaceous material since the principle of the method depends solely on the protection provided by the vitreous film formed on the surface of the carbonaceous material which is not free from unevenness or damage as well as peeling of the film off the surface due to the difference between the coefficients of thermal expansion of the carbonaceous material and the vitreous surface film eventually to cause localized oxidation of the carbonaceous material. The third method of formulating a carbonaceous material or graphite with an additive including silicon carbide and a binder is considerably effective for the improvement of the oxidation resistance thereof but the effectiveness of the method is far from satisfactory. For example, such a carbonaceous material may lose 10 to 30% of the weight when it is heated in air at 900° C. for 5 hours. Moreover, the addition of such a binder component adversely affects the densification of the sintered body necessarily leading to a great decrease in the mechanical strengths of the sintered body.

On the other hand, some of the inventors have previously proposed (see Japanese Patent Kokai No. 56-140075) a method for the preparation of a carbon-ceramic composite material by sintering a compression-molded body of a powdery mixture of a pulverized specific coke and a ceramic powder such as silicon carbide SiC, boron carbide $B_4C$ or alumina $Al_2O_3$ in a relatively large proportion of, for example, 30 to 50% by weight in the mixture. The carbon-ceramic composite body prepared by this method is, however, not satisfactorily resistant against oxidation at high temperatures and loses 5% or more of weight when heated in air at 1000° C. for 5 hours.

Thus, no method is known in the prior art suitable for the preparation of a carbonaceous material highly resistant against oxidation in air when heated at 1000° C. or higher.

SUMMARY OF THE INVENTION

It is therefore an object of the present invention to provide a novel and improved carbonaceous body having an outstandingly high resistance against oxidation when heated in air even at 1000° C. or higher as freed from the disadvantages and problems in the conventional carbonaceous materials.

Another object of the present invention is to provide a method for the preparation of a carbonaceous body having an outstandingly high resistance against oxidation at elevated temperatures.

The carbonaceous body of the invention is a sintered body obtained by shaping and sintering a powdery mixture comprising a powder of a low-temperature coke and a combination of powders of boron carbide and silicon carbide, the weight proportion of the boron carbide and the silicon carbide being in the range from 2:98 to 80:20 and the volume proportion of the coke powder and the combination of the powders of boron carbide and silicon carbide being in the range from 50:50 to 95:5. The step of sintering of the shaped powdery mixture is undertaken in an inert atmosphere at a temperature of 1000° C. or higher.

BRIEF DESCRIPTION OF THE DRAWINGS

FIG. 1 also includes some results with conventional carbonaceous materials.

DETAILED DESCRIPTION OF THE PREFERRED EMBODIMENTS

Figure 1:
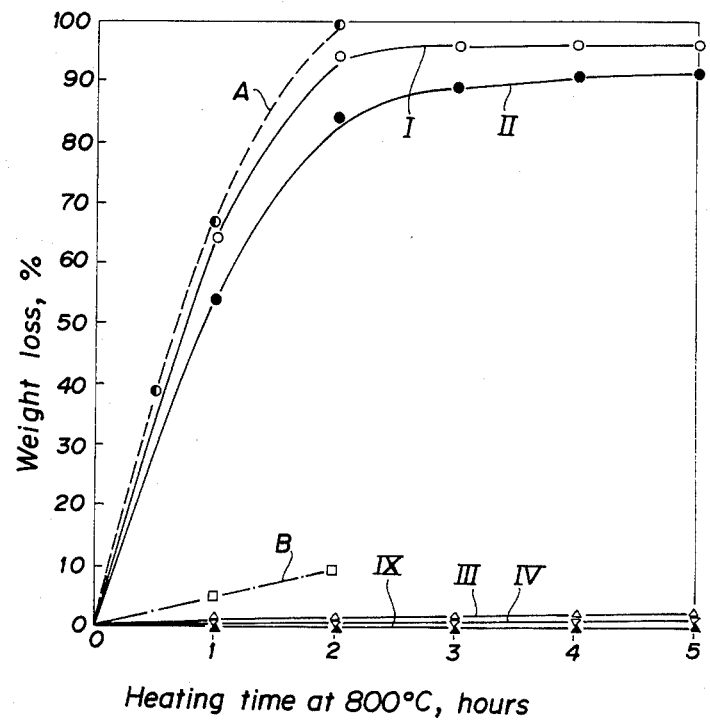
FIGS. 1 and 2 are each a graphic showing of the weight loss of the inventive carbonaceous bodies heated in air at 800° C. and 1000° C., respectively.

As is understood from the above description, the base component in the powdery mixture to be shaped and sintered into the inventive carbonaceous body is a powder of a low-temperature coke or a semi-coke which is defined as a coke material obtained by coking a coal tar pitch, petroleum residue or resinous material at a relatively low temperature of 600° C. or below. The extent of the coking should preferably be not so far as to leave at least 4% by weight of the volatile matter determined according to JIS M 8812 from the standpoint of obtaining a sintered carbonaceous body having sufficiently high mechanical strengths.

The additive components to be admixed with the above described coke powder are boron carbide and silicon carbide used in combination each in a powdery form. It should be noted that the desired effect of enhancing the oxidation resistance of a carbonaceous material can never be obtained by the single use of either boron carbide or silicon carbide and combination of both is essential. The proportion of the boron carbide and silicon carbide should also be in a suitable range of 2:98 to 80:20 by weight or, preferably, in the range from 5:95 to 75:25 by weight. When the proportion is outside this range, the improvement in the oxidation resistance of a carbonaceous body is less remarkable. It is noteworthy that the boron carbide or silicon carbide may be replaced with other boron or silicon compounds, such as boron oxide or silicon oxide, capable of being converted into the corresponding carbide when heated in contact with the coke powder in the course of sintering. In particular, an unexpectedly high oxidation resistance of the carbonaceous sintered body at 1400° C. or higher can be obtained when the weight proportion of boron carbide to silicon carbide is in the range from 2:98 to 49:51.

It is also noted that the proportion of boron carbide to silicon carbide should be relatively large when the carbonaceous body is to be used at a temperature of 1000° C. or below while the proportion of silicon carbide should be increased when the carbonaceous body is to be used at a higher temperature, e.g. 1400° C., in respect of the oxidation resistance. This is presumably because the boron carbide readily forms a glassy protecting film by oxidation even at 1000° C. or below while the silicon carbide also forms a glassy protecting film by oxidation when heated at 1000° C. or higher. In addition, the melt viscosity of the glassy film may be too low at higher temperatures when it is formed with a relatively large amount of boron oxide and loss of the oxidized compounds of boron such as $B_2O_3$ and $HBO_2$ by decomposition and dissipation is no longer negligibly small at higher temperatures than 1000° C. In this regard, the recommended proportion of boron carbide to silicon carbide is in the range from 50:50 to 80:20 or, preferably, 55:45 to 70:30 when the carbonaceous body is used at 1000° C. or below and the proportion should be 50:50 to 2:98 or, preferably, 5:95 to 50:50 when the carbonaceous body is used at higher temperatures.

The proportion of the coke powder and the combination of the boron carbide and silicon carbide is also important and the volume ratio of the former to the latter should be in the range from 50:50 to 95:5 or, preferably, from 70:30 to 90:10.

It is a desirable condition in order to give a sintered body having an outstandingly low porosity and high mechanical strengths that the powdery mixture of the low-temperature coke, boron carbide and silicon carbide is subjected to mechanical grinding in order to utilize the so-called mechanochemical effect produced by the mechanical pulverization and grinding which contributes to the susceptibility of the powdery mixture to binding and sintering even without the addition of a binder or a sintering aid responsible to the porosity of a sintered body. For example, powders of boron carbide and silicon carbide each having a fineness of around 1 $\mu$m of the particle diameter are mixed with the coke and the mixture is mechanically ground to give a volume average particle diameter of the powder mixture reduced to about 25 $\mu$m or smaller or, preferably, about 5 $\mu$m or smaller.

The powdery mixture thus ground is then shaped into a desired form by compression molding or other suitable methods and sintered by heating at 1000° C. or higher in an inert atmosphere.

The inventive carbonaceous sintered body is greatly resistant against oxidation when heated in air and loses, for example, only 1% or smaller of the weight after heating in air at 800° C. for 5 hours or only 3% or smaller of the weight after heating in air at 1400° C. for 5 hours. This oxidation resistance is quite surprising when comparison is made with conventional carbonaceous materials which sometimes lose as large as 65 to 85% of the weight by heating at 800° C. for 1 hour and eventually completely oxidized by heating for 2 hours at 800° C. Moreover, the inventive carbonaceous sintered body has a mechanical strength several to ten times larger than that of conventional artificial graphites along with an electric volume resistivity approximating that of artificial graphites. Therefore, the inventive carbonaceous sintered bodies are useful as a material for various machine parts, refractory material in the ceramic industry, anti-corrosive material in chemical plants, materials for the electric and electronic industries and others by utilizing the advantageous properties inherent to carbonaceous materials in general such as high-temperature strength, thermal shock resistance, high heat conductivity and electric conductivity, low thermal expansion and the like in addition to the additional features of the high mechanical strength and excellent resistance against oxidation characteristic to the inventive carbonaceous sintered bodies.

Following are the examples to illustrate the invention in more detail but not to limit the scope of the invention in any way.

EXAMPLE

A low-temperature coke prepared by coking a petroleum residue at about 500° C. and containing about 10% by weight of a volatile matter was pulverized in a vibration ballmill for 1 hour. The resultant coke powder had a true density of 1.35 g/cm$^3$.

The coke powder was then admixed with powder of boron carbide and silicon carbide in amounts each indicated in Table 1 below and each of the powdery mixtures was further ground in a machined mortar-and-pestle for 5 hours to have a volume average particle diameter of 3 $\mu$m. The powdery mixture was shaped into a form by compression molding under a pressure of 2 tons/cm$^2$ and sintered by heating at 2000° C. for 1 hour in an atmosphere of argon.

The values of the volume ratio of coke in % given in Table 1 were obtained by the calculation using the values of the true densities of 1.35 g/cm$^3$ for the coke powder, 2.50 g/cm$^3$ for the boron carbide and 3.17 g/cm$^3$ for the silicon carbide.

The thus prepared carbonaceous sintered bodies were subjected to the measurements of the bulk density, bending strength and electric volume resistivity to give the results shown in Table 1, which also includes corresponding typical values in the conventional artificial graphites. As is apparent from the comparison between the data for the inventive carbonaceous bodies and artificial graphites, the inventive carbonaceous bodies have a much larger bending strength while the bulk density and volume resistivity of the former are only slightly larger than in the latter.

TABLE 1

| Sample No. | Powder taken, g | | | B₄C:SiC weight ratio | Volume ratio of coke, % | Sintered body | | |
|---|---|---|---|---|---|---|---|---|
| | Coke | Boron carbide B₄C | Silicon carbide SiC | | | Bulk density, g/cm³ | Bending strength, kg/cm² | Volume resistivity, × 10⁻³ ohm·cm |
| 1* | 7.35 | 0.09 | 0.06 | 58:42 | 99 | 1.9 | 620 | 1.6 |
| 2* | 7.28 | 0.17 | 0.13 | 58:42 | 98 | 2.0 | 680 | 1.6 |
| 3 | 7.05 | 0.44 | 0.32 | 58:42 | 95 | 1.9 | 800 | 1.7 |
| 4 | 6.68 | 0.87 | 0.63 | 58:42 | 90 | 2.0 | 900 | 2.1 |
| 5* | 5.94 | 0 | 3.49 | 0:100 | 80 | 2.0 | 1170 | 6.6 |
| 6 | 5.94 | 0.17 | 3.27 | 5:95 | 80 | 2.0 | 1100 | 3.7 |
| 7 | 5.94 | 0.67 | 2.64 | 20:80 | 80 | 2.0 | 1100 | 3.1 |
| 8 | 5.94 | 1.54 | 1.53 | 50:50 | 80 | 2.0 | 1100 | 3.1 |
| 9 | 5.94 | 1.74 | 1.26 | 58:42 | 80 | 2.0 | 1150 | 3.1 |
| 10 | 5.94 | 2.09 | 0.76 | 73:27 | 80 | 1.9 | 1160 | 3.0 |
| 11* | 5.94 | 2.75 | 0 | 100:0 | 80 | 1.9 | 1220 | 2.8 |
| 12 | 5.20 | 1.01 | 3.95 | 20:80 | 70 | 2.0 | 1080 | 7.0 |
| Artificial graphite | | | | | | 1.5–1.8 | 150–300 | 0.8–1.2 |

*Comparative example

Figure 2:
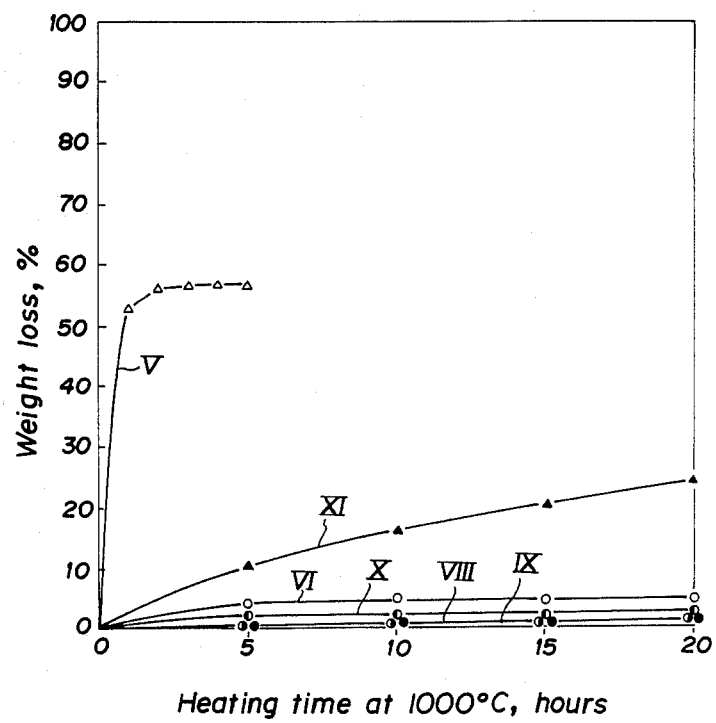

Small blocks of each 7 mm by 7 mm by 5 mm were taken by cutting each of the above prepared carbonaceous sintered bodies and heated in a tubular electric furnace having an inner diameter of 35 mm and kept at 800° C., 1000° C. or 1400° C. under a stream of air at a rate of 2 liters/minute. The test pieces were periodically taken out of the furnace to determine the weight decrease. The results of the weight decrease in time are graphically shown in FIGS. 1 and 2. FIG. 1 is for the tests undertaken at 800° C. with the samples No. 1, 2, 3, 4 and 9 in Table 1 each indicated by the curve I, II, III, IV or IX, respectively. For comparison, FIG. 1 also includes the curves A and B indicating the results obtained with an artificial graphite and a conventional glass-impregnated carbonaceous material, respectively. FIG. 2 indicates the results obtained at 1000° C. with the samples No. 5, 6, 8, 9, 10 and 11 in Table 1 by the curves V, VI, VIII, IX, X and XI, respectively. As is clear from these figures, the carbonaceous sintered bodies according to the invention were highly resistant against air oxidation and lost only 1% or smaller of the weight after heating in air at 800° C. for 5 hours and the weight loss of the samples Nos. 6, 8 to 10 was only a few % even after heating at 1000° C. for 20 hours. The oxidation resistance of the samples No. 7 and No. 12 was excellent indicating a weight loss of 3% or smaller after heating in air at 1400° C. for 5 hours while similar samples in which the weight ratio of boron carbide and silicon carbide was 60:40 and the volume proportion of the coke powder in the powdery mixture was 80% or 70% lost 15 to 20% of the weight under the same heating conditions in air at 1400° C.

What is claimed is:

1. A carbonaceous shaped body which is a sintered body of a powdery mixture comprising a powder of a low-temperature coke and a combination of powders of boron carbide and silicon carbide, the weight proportion of the boron carbide and the silicon carbide being in the range from 2:98 to 80:20 and the volume proportion of the coke powder to the combination of the powders of boron carbide and silicon carbide being in the range from 50:50 to 95:5.

2. The carbonaceous shaped body as claimed in claim 1 wherein the weight proportion of the boron carbide to the silicon carbide is in the range from 2:98 to 50:50.

3. The method as claimed in claim 1 wherein the powdery mixture obtained in step (a) is mechanically ground prior to step (b) so as to have an average particle diameter smaller than 25 μm.

4. A method for the preparation of a carbonaceous shaped body which comprises the steps of:
   (a) mixing together a powder of a low-temperature coke containing at least 4% by weight of a volatile matter, a powder of boron carbide and a powder of silicon carbide in such a proportion that the weight proportion of the boron carbide to the silicon carbide is in the range from 2:98 to 80:20 and the volume proportion of the coke powder to the combination of the boron carbide and the silicon carbide is in the range from 50:50 to 95:5 to form a uniform powdery mixture,
   (b) shaping the powdery mixture into a form, and
   (c) heating the shaped form of the powdery mixture at a temperature of 1000° C. or higher in an inert atmosphere.

5. The shaped body of claim 1 wherein the powdery mixture from which the body is sintered contains at least 50% by weight of the coke powder.

6. The method of claim 4 wherein the powdery mixture prior to heating contains at least 50% by weight of the coke powder.

* * * * *